United States Patent [19]

Toft, Jr. et al.

[11] Patent Number: 4,472,076

[45] Date of Patent: Sep. 18, 1984

[54] CLIP FOR ANCHORING CROSS MEMBERS IN TELESCOPING SHELF SUPPORTS

[75] Inventors: Charles F. Toft, Jr., Houston; Mickey Walker, Brenham, both of Tex.

[73] Assignee: Industrial Tool & Die Co. Inc., Houston, Tex.

[21] Appl. No.: 295,862

[22] Filed: Aug. 24, 1981

[51] Int. Cl.³ .............................................. F16B 9/02
[52] U.S. Cl. ................................... 403/199; 403/233; 403/191; 108/111; 211/186
[58] Field of Search ................. 108/111, 153; 211/189, 211/186, 187, 182; 403/199, 191, 190, 233, 231

[56] References Cited

U.S. PATENT DOCUMENTS 2,008,087  7/1935  Stromberg ........................ 403/189
3,398,981  8/1968  Vincens ........................... 108/153 X

FOREIGN PATENT DOCUMENTS 1164962  5/1958  France ............................. 403/387

Primary Examiner—Cornelius J. Husar
Assistant Examiner—Joseph A. Fischetti
Attorney, Agent, or Firm—Ranseler O. Wyatt

[57] ABSTRACT

A clip for telescoping shelf supports for use in anchoring shelving, such as in forming a metallic shelf framework, providing means for erecting and maintaining shelf supports without the use of screws or bolts. A base member is anchored to the outer wall of a male section of the framework, as by welding, and an anchor member is mounted on the frame at a point where the cross member is to be mounted, and is held in place by means of a tension plate, which engages the anchor member and on which are formed outwardly extending lips which receive the side margins of the base member mounted on the cross bar. The frame is composed of telescoping male and female sections having spring loaded stops adapted to extend upwardly through spaced openings in the other and adjoining member.

3 Claims, 3 Drawing Figures

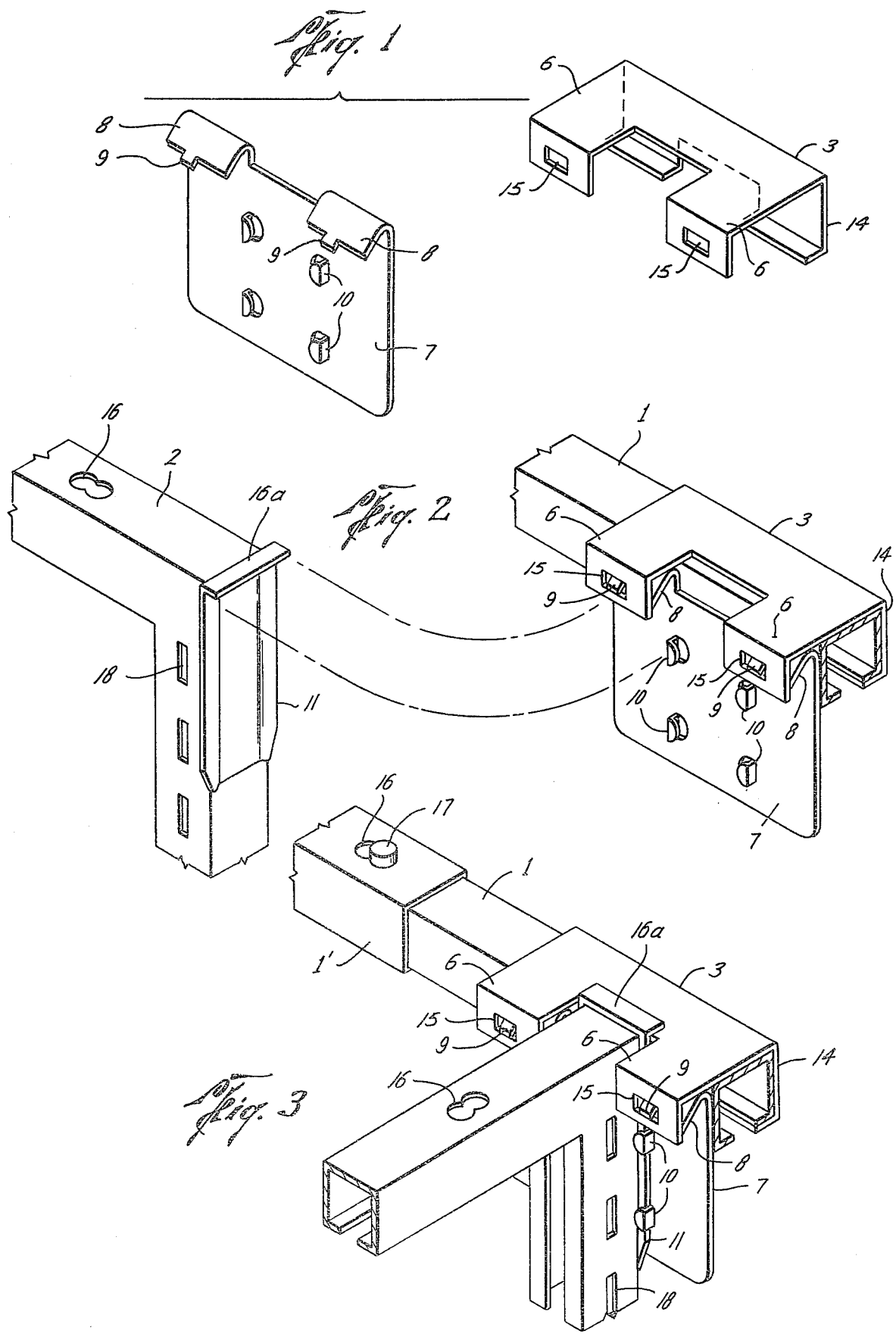

CLIP FOR ANCHORING CROSS MEMBERS IN TELESCOPING SHELF SUPPORTS

SUMMARY OF THE INVENTION

A clip for anchoring cross members in telescoping frameworks for shelf supports, having a base member permanently secured on the cross member of the framework and an anchoring member mounted on a section of the main framework and a tension plate movable into anchoring relation with the anchor member, said tension plate having outwardly extending lips to receive the side margins of said base member.

BACKGROUND OF THE INVENTION

In shelf supports, such as are commonly employed in retail stores for display of merchandise, a principal objection to the type now in common use is the time it takes for assembly and dissembly, because of the necessity of applying nuts and bolts, or screws, to the members of the structure. It is the object of this invention to provide novel means for quickly assembling, or disassembly, of the shelf support, without the use of bolts or screws.

BRIEF DESCRIPTION OF THE DRAWING

FIG. 1 is an exploded view of the anchor and tension plate.

FIG. 2 is an exploded view of the assembled anchor and tension plate, and the base member to be mounted thereon, and FIG. 3 is a fragmentary view of a framework having the anchor member and cross member mounted thereon.

DESCRIPTION OF THE PREFERRED EMBODIMENT

In the drawings, the numeral 1 designates a section of a shelf support frame adapted to be joined to abutting sections telescopically. These sections are channel shaped, the male section 1 being smaller than the female section 1' and the section 2 being angular, for forming the cross bars, as well as for forming end members of the framework. An anchor member 3 has the legs 14, 14 extending downwardly and bent inwardly adjacent their extended ends and the legs 6, 6 extending outwardly and being bent downwardly adjacent their extended ends as shown in the drawings; each downwardly bent portion having an opening as 15 formed therein. A tension plate 7 has the outwardly and downwardly extending legs 8, 8 which have the tips 9, 9 formed on the ends of the legs 8, 8 which are adapted to be received in the openings 15, 15 in the ends of the legs 6, 6. As the plate 7 is mounted on the frame, with the tips 9, 9 inserted in the openings 15, 15, the plate is moved rearwardly against the frame, placing the plate 7 under tension and anchoring the same onto the frame 1. The outwardly and downwardly extended legs 8, 8 fit tightly between the downwardly turned portion of the legs 6, and the framework section 1, and the plate 7 is at an angle when the tips 9 are inserted in the openings 15, and it requires pressure to move the lower end of the plate 7 rearwardly abutting the side wall of the framework section 1, and after it has been so moved, the continuing tension of the legs 8 and 6 hold the plate securely in place.

The base member 11, formed of flat, rigid material, and having one end overturned, as 16a, and the other end tapered downwardly, is permanently anchored on a frame section, such as where it is desired to place a cross support between two frameworks, to receive shelving. The tension plate 7 has the outwardly extending lips 10, 10 which may be punched out of the material of the plate and extend outwardly, and which are bent inwardly to form means for receiving the side margins of the base member 11 and will be guides for positioning the cross bar. The overturned end of the base member will provide stop means for the base member as it is mounted on the clip.

The clip may be used to engage cross bars, and to anchor same at top or bottom of the framework and may be quickly and easily assembled and dissembled without bolts or screws, at any desired position on the framework. To dissemble the framework, the telescoping members may be disengaged by depressing the buttons 17, 17 which extend outwardly through the passageways 16, 16 and the sections disengaged by withdrawing the female section 1 from the male section 1'. The tension plate 7 may be grasped by the downwardly extending end and moved outwardly, and upwardly, releaving the tension on the anchor member 3, and then removed from engagement in the openings 15 and the clip dissembled. Shelves may be mounted in the usual manner by engagement with the openings 18, 18 at selected positions.

What we claim is:

1. In a clip for erecting and maintaining shelf supports in shelf supporting position, a base member anchored to a section of shelf supporting framework, an anchor member adapted to be seated on another section of the framework, a tension plate engaged with said anchor member under tension, and means on said tension plate for receiving said base member in forming a shelf support framework, said framework being composed of telescoping sections, means for selectively positioning said sections with relation to each other and releasably locking same in the selected positions.

2. The device defined in claim 1 wherein said anchor member has downwardly extending legs on one side which are bent inwardly adjacent their respective ends and outwardly extended legs on the opposite side being downwardly turned adjacent their extended ends and having projection receiving openings in said downwardly turned portions of said last mentioned legs and said tension plate having outwardly and downwardly extending legs and projections extending outwardly from said last mentioned legs adapted to be received by said projection receiving openings.

3. The device defined in claim 1 wherein said means of said tension plate for receiving said base member consists of projections stamped out of said plate and the stamped out material being bent forming laterally extending gripping means for receiving the side margins of the base member.

* * * * *